US012775232B2

(12) United States Patent
Fukamachi et al.

(10) Patent No.: US 12,775,232 B2
(45) Date of Patent: Oct. 27, 2026

(54) IMAGE FORMING APPARATUS CAPABLE OF EXECUTING BORDERLESS PRINT JOBS

(71) Applicant: CANON KABUSHIKI KAISHA, Tokyo (JP)

(72) Inventors: Asuna Fukamachi, Chiba (JP); Takahiro Ohnishi, Chiba (JP); Shigeru Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/175,954

(22) Filed: Apr. 10, 2025

(65) Prior Publication Data

US 2025/0321525 A1 Oct. 16, 2025

(30) Foreign Application Priority Data

Apr. 15, 2024 (JP) ................................ 2024-065810

(51) Int. Cl.

| | |
|---|---|
| ***G03G 15/00*** | (2006.01) |
| ***B08B 1/20*** | (2024.01) |
| ***B08B 1/30*** | (2024.01) |
| ***G03G 15/20*** | (2006.01) |
| ***G06F 3/12*** | (2006.01) |

(52) U.S. Cl.

CPC ........... *G03G 15/5029* (2013.01); *B08B 1/20* (2024.01); *B08B 1/30* (2024.01); *G03G 15/2025* (2013.01); *G03G 15/2064* (2013.01); *G03G 15/5016* (2013.01); *G06F 3/121* (2013.01); *G06F 3/1235* (2013.01); *G06F 3/1253* (2013.01)

(58) Field of Classification Search

CPC ........... G03G 15/2025; G03G 15/2064; G03G 15/5016; G03G 15/5029; G06F 3/121; G06F 3/1235; G06F 3/1253; B08B 1/30; B08B 1/20

See application file for complete search history.

(56) References Cited

U.S. PATENT DOCUMENTS

| | | | | |
|---|---|---|---|---|
| 2009/0136247 | A1* | 5/2009 | Nada .................... | G03G 15/043 399/45 |
| 2010/0310288 | A1* | 12/2010 | Takagi ............... | G03G 15/2025 399/327 |
| 2019/0089847 | A1* | 3/2019 | Tokuchi ................ | G06F 3/1253 |

FOREIGN PATENT DOCUMENTS

| | | |
|---|---|---|
| JP | 2010139881 A | 6/2010 |

* cited by examiner

*Primary Examiner* — Hoang X Ngo
(74) *Attorney, Agent, or Firm* — Canon U.S.A., Inc. IP Division

(57) ABSTRACT

An image forming apparatus is capable of executing a borderless print job to form a toner image at edges of a recording material and of executing a bordered print job not to form a toner image at the edges of the recording material. The image forming apparatus includes at least one processor configured to control a display unit to display a screen, wherein, after the borderless print mode is set and before printing of the borderless print job is started, the display unit is controlled to display a warning screen that prompts execution of a cleaning operation based on job information regarding the borderless print job, and after execution of the borderless print job is completed, perform control to execute a cleaning operation to clean an inside of the image forming apparatus with conveyed paper.

10 Claims, 10 Drawing Sheets

IMAGE FORMING APPARATUS CAPABLE OF EXECUTING BORDERLESS PRINT JOBS

BACKGROUND

Field of the Disclosure

The present disclosure relates to an image forming apparatus that forms an image on a recording material.

Description of the Related Art

In recent years, to increase added-values of deliverables, image forming apparatuses using electrophotography have been demanded to output, not only a general-bordered print product provided with margins at the edges of a recording material, but also a borderless print product that is not provided with margins at the edges of a recording material and in which an image is formed on the whole surface of the recording material. The borderless print represents a print of a print product not provided with margins at least at a part of the edges of the recording material, and requires image formation in a size larger than that of the recording material and transfer of an image to the recording material. However, in a case where an image is formed in a size larger than that of the recording material and transferred to the recording material, toner adheres to edges corresponding to a thickness portion of the recording material. Toner adhering to the edges of the recording material is less likely to be fixed to the recording material, comes off easily when touched, and adheres to something other than the recording material, causing soils.

Japanese Patent Application Laid-Open No. 2010-139881 proposes a technique of providing a cleaning means capable of coming in contact with/separating from a fixing member and cleaning the fixing member.

SUMMARY

According to an aspect of the present disclosure, an image forming apparatus is capable of executing a borderless print job to form a toner image at edges of a recording material to which a borderless print mode is set and of executing a bordered print job not to form a toner image at the edges of the recording material. The image forming apparatus includes at least one processor configured to control display a display unit to display a screen, wherein, after the borderless print mode is set and before printing of the borderless print job is started, the display unit is controlled to display a warning screen that prompts execution of a cleaning operation based on job information regarding the borderless print job, and after execution of the borderless print job is completed, perform control to execute a cleaning operation to clean an inside of the image forming apparatus with conveyed paper.

Further features of various embodiments will become apparent from the following description of exemplary embodiments with reference to the attached drawings.

DESCRIPTION OF THE EMBODIMENTS

An image forming apparatus and fixing temperature control according to embodiments of the present disclosure will be described.

Numeric values and configuration conditions described in exemplary embodiments represent merely reference numeric values and reference configurations, and do not limit every embodiment.

Figure 1:
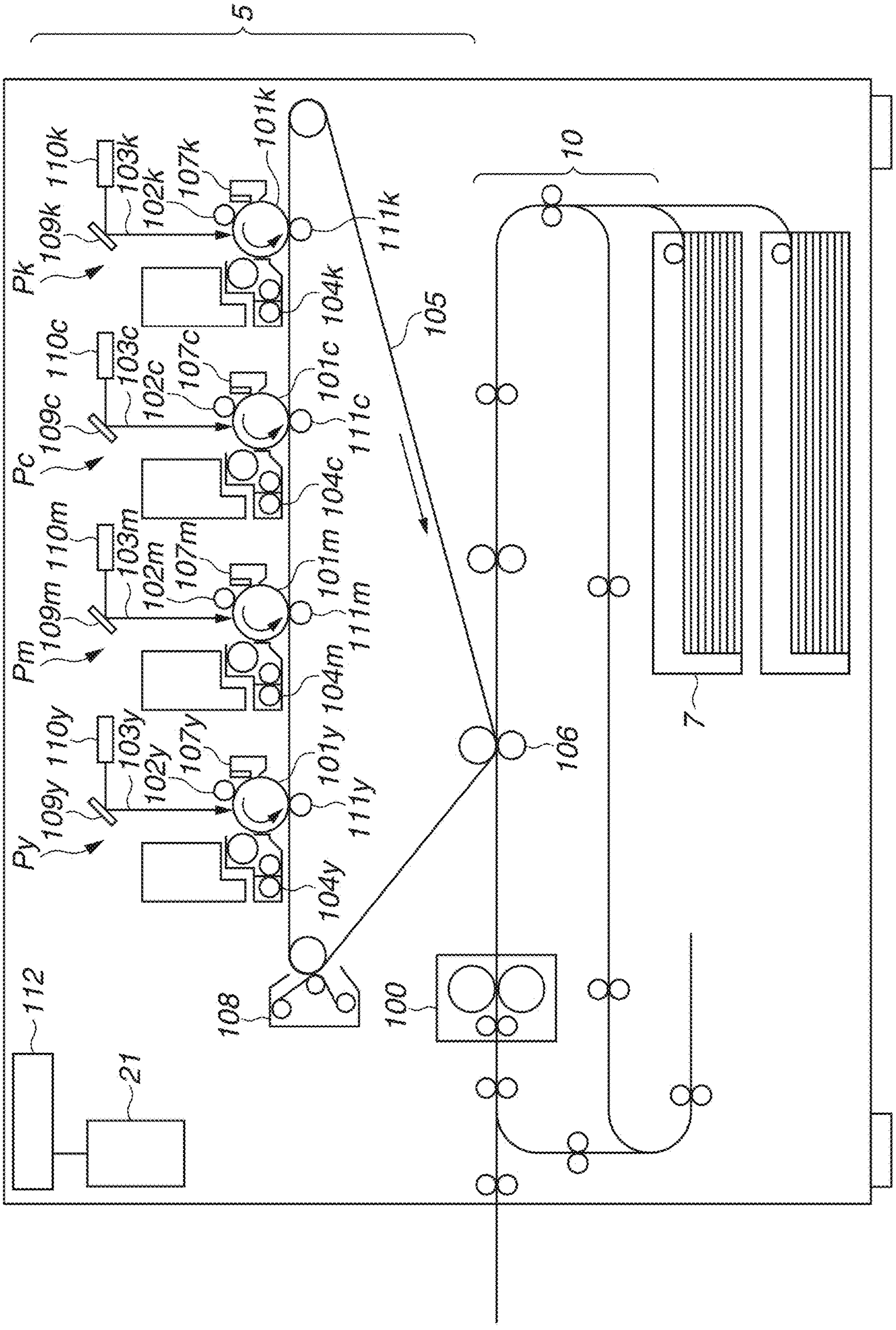
FIG. 1 is a cross-sectional configuration diagram illustrating an image forming apparatus according to a first exemplary embodiment.

FIG. 1 is a cross-sectional configuration diagram illustrating the image forming apparatus. In a first exemplary embodiment, a description is given of an image forming apparatus that forms an image using an electrophotographic process as an example.

A sheet feeding mechanism 7, an image forming unit 5, and a fixing device 100 are sequentially disposed inside the image forming apparatus from an upstream side of a recording material conveyance path to a downstream side of the recording material conveyance path.

Figure 2:
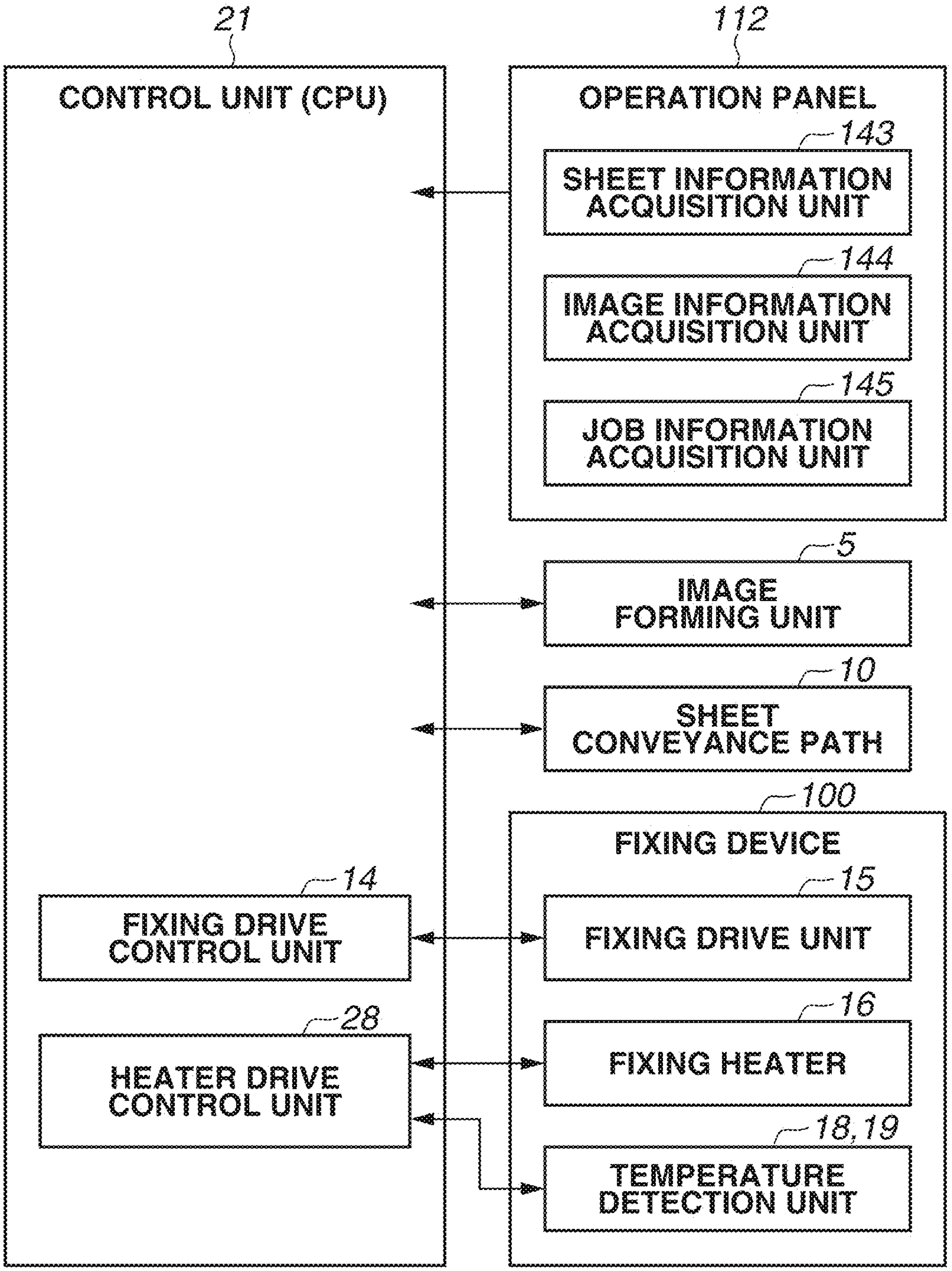
FIG. 2 is a control block diagram illustrating the image forming apparatus according to the first exemplary embodiment.

As illustrated in FIG. 2, the image forming apparatus includes a control unit 21 and an operation panel 112. The control unit 21 is represented by a central processing unit (CPU) and the like. The operation panel 112 serves as an interface for communicating with a user and an external apparatus and accessing an apparatus. The operation panel 112 has a configuration in which a display unit that displays a screen and an acceptance unit that accepts an instruction from the user overlap with each other, and is capable of accepting the user's instruction input to a screen displayed on the operation panel 112. Screen display on the display unit is controlled by the control unit 21 as a display control unit.

The operation panel 112 functions as an interface used by the user to access the image forming apparatus. The control unit 21 performs centralized control of an instruction system between devices including the image forming unit 5, the sheet feeding mechanism 7, a sheet conveyance path 10, and the fixing device 100 while monitoring and controlling states of locations inside each device, and thereby coordinates an operation of the whole of the image forming apparatus.

The operation panel 112 includes a sheet information acquisition unit 143, an image information acquisition unit 144, and a job information acquisition unit 145. The sheet information acquisition unit 143 acquires sheet information that is input by the user as print job information such as a basis weight, a surface property, and a size. The image information acquisition unit 144 acquires basic setting information regarding image information such as a density. The job information acquisition unit 145 acquires job information regarding the number of prints in the job, double-sided/ single-side print, and a "borderless print mode". The borderless print mode is a mode of performing print by forming an image on the whole surface without providing margins at edges of a sheet.

The job in the present exemplary embodiment is print data in a format converted into a format that can be processed by the control unit 21, and includes, not only a print instruction to the control unit 21 as described above, but also includes information such as the number of sheets to be printed and a paper type of the sheet.

Figure 9:
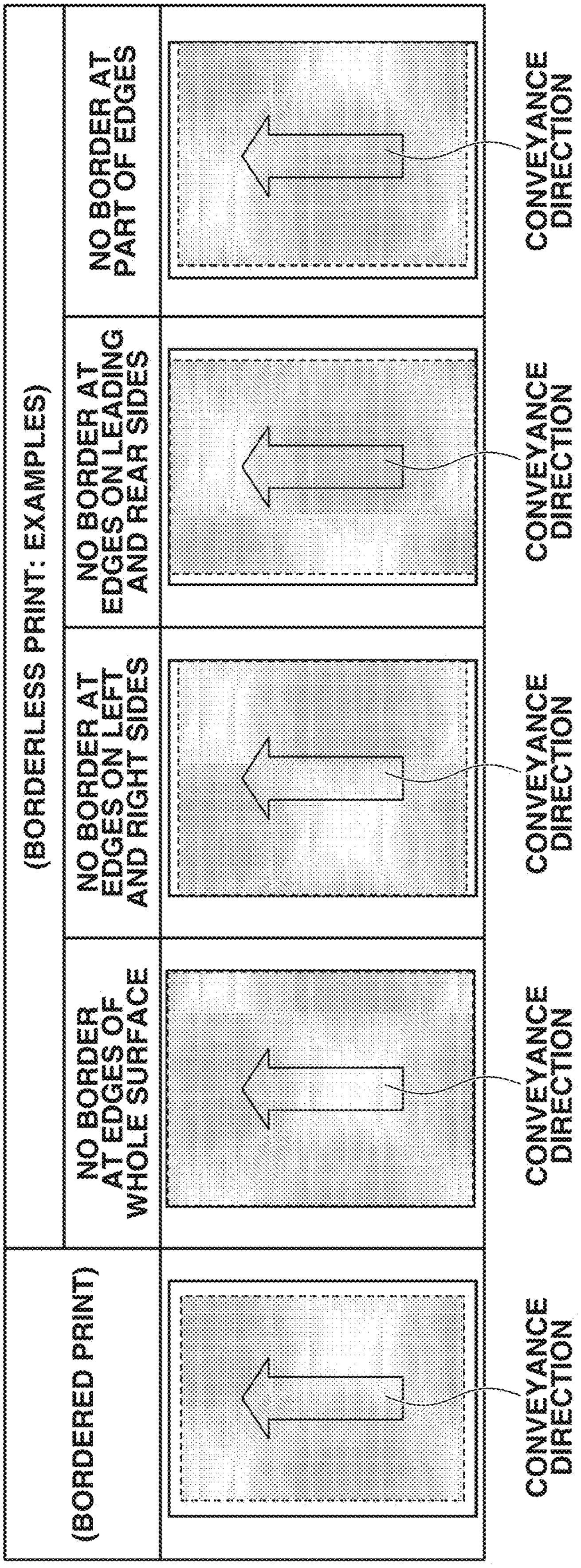
FIG. 9 is a diagram for describing borderless print.

An example of borderless print is described with reference to FIG. 9. A job to which the borderless print mode is set is referred to as a borderless print job, and a job to which the borderless print mode is not set (a job to which a bordered print mode is set) is referred to as a bordered print job. The image forming apparatus in the present exemplary embodiment is an image forming apparatus that executes bordered print and borderless print, and switches print between the bordered print and the borderless print based on the job information. First, the bordered print represents print to form an image while providing margins on four sides of a recording material. In contrast, borderless print represents print to obtain a print product in which margins are not provided on at least part of the edges of the recording material. The borderless print has a plurality of variations, and includes print to form an image on edges of the whole surface in four sides of the recording material. Additionally, the borderless print includes print to form an image on edges on short sides of the recording material, print to form an image on edges on long sides of the recording material, and print to form an image on edges on three sides of the recording material.

(Image Forming Unit)

A photosensitive drum 101 as an image bearing member is rotationally driven in a counterclockwise direction indicated by an arrow at predetermined process speed (circumferential speed). The photosensitive drum 101 is charged to a predetermined polarity in charging processing by a charging device 102 such as a charging roller in a rotational process of the photosensitive drum 101.

The photosensitive drum 101 is subjected to exposure processing with laser light 103 output from a laser optical system 110 onto a charging processing surface of the photosensitive drum 101 based on input image information. The laser optical system 110 outputs laser light 103 that is modulated (ON/OFF) in response to a time-series electric digital picture signal of target image information from an image signal generation device such as an image reading device, which is not illustrated, scans the surface of the photosensitive drum 101, and exposes the surface of the photosensitive drum 101 with the laser light 103. As a result, with this scanning and exposure, an electrostatic-latent image corresponding to the image information is formed on the surface of the photosensitive drum 101. A deflecting mirror 109 deflects the laser light 103 output from the laser optical system 110 to an exposure position of the photosensitive drum 101.

The electrostatic latent image formed on the photosensitive drum 101 is visualized with yellow toner by a yellow developing device among developing devices 104. This yellow toner image is transferred to a surface of an intermediate transfer member 105 in a primary transfer unit 111*y* serving as a contact portion between a photosensitive drum 101*y* and the intermediate transfer member 105. Residual toner on the surface of the photosensitive drum 101*y* is cleaned by a drum cleaner 107*y*.

At the time of bordered print, an electrostatic-latent image in a range that is narrower than a sheet is formed on the surface of the photosensitive drum 101. At the time of borderless print, an electrostatic-latent image in a range that is wider than the recording material is formed on the surface of the photosensitive drum 101. As a result, a general bordered sheet provided with margins at edges of the sheet and a borderless sheet in which an image is formed on the whole of the sheet are formed.

An image forming section Py is a yellow image formation section. An image forming section Pm is a magenta image forming section. An image forming section Pc is a cyan image forming section. An image forming section Pk is a black image forming section. The image forming sections Py, Pm, Pc, and Pk form images in corresponding colors.

When printer job information is input from the operation panel 112 to the control unit 21 and an instruction for image forming processing is given, a separation roller (feeding roller) 8*a* or 8*b* for a cassette 7*a* or 7*b* that accommodates sheets each having a designated size is driven. With this operation, sheets P from the cassette 7*a* or 7*b* are separated sheet by sheet, pass through the sheet conveyance path 10 including a conveyance roller 9*a* or conveyance rollers 9*a* and 9*b*, and introduced into a secondary transfer unit 106 in the image forming unit 5.

Respective multi-color toner images sequentially superimposed on the intermediate transfer member 105 are secondarily and collectively transferred onto the introduced recording material in the secondary transfer unit 106. Residual toner on the surface of the intermediate transfer member 105 is cleaned by an intermediate transfer member cleaner 108.

The sheet, which has passed through the secondary transfer unit 106, is introduced into the fixing device 100 as an image heating device, and is subjected to fixing processing (image heating processing) of fixing an unfixed toner image by the fixing device 100. The sheet on which the fixing processing has been performed is discharged to the outside the image forming apparatus, and a series of image forming operation ends.

(Fixing Device)

Figure 3:
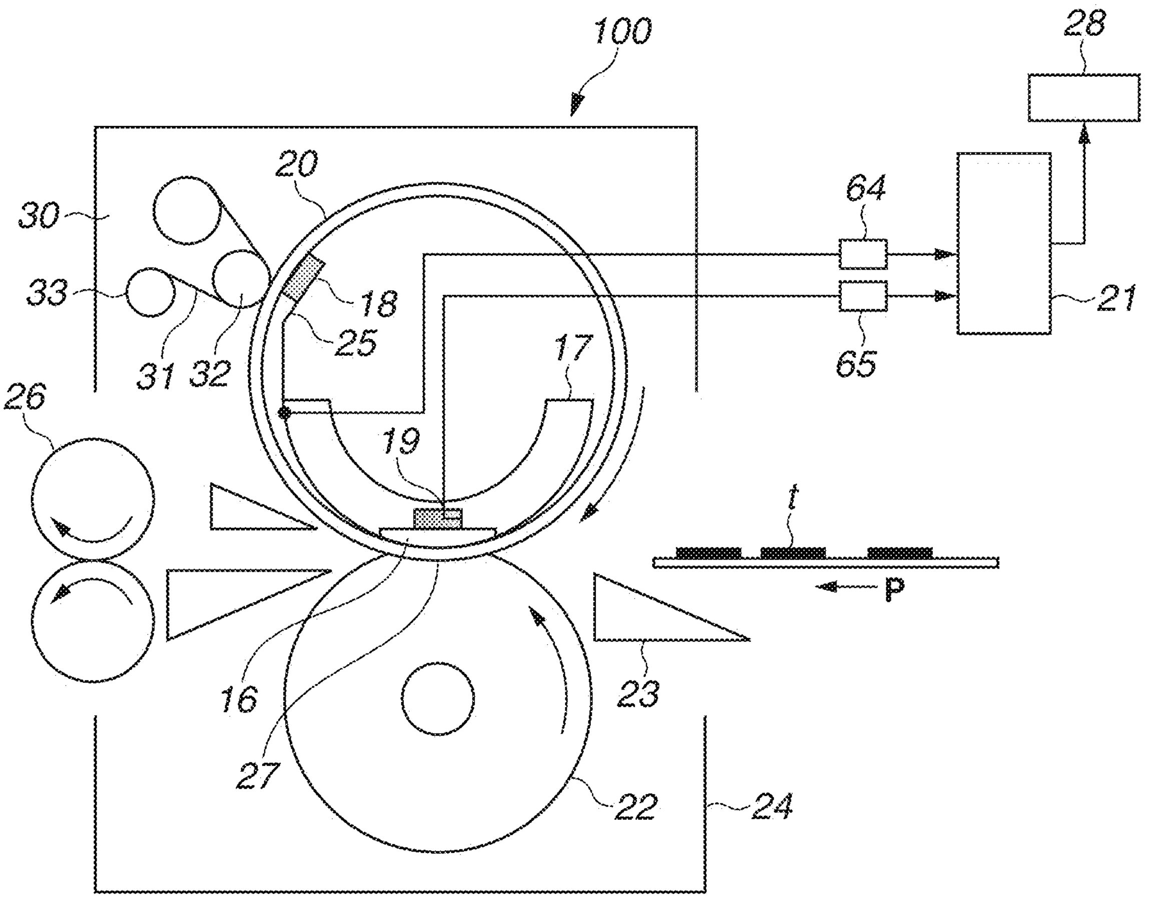
FIG. 3 is a configuration diagram illustrating a fixing device according to the first exemplary embodiment.

FIG. 3 is a cross-sectional configuration diagram illustrating the fixing device 100.

A fixing belt (endless belt) 20 includes an elastic layer and has a cylindrical shape, and a pressure roller 22 serves as a pressure rotary member that forms a fixing nip between the pressure roller 22 and a fixing belt 20. A fixing heater 16 serves as a heating member. A heater holder 17 has a substantially gutter-shape as a cross-sectional shape and heat resistance. The fixing heater 16 is bonded and fixed to a lower surface of the heater holder 17 in a longitudinal direction and is configured to be slidable on the fixing belt 20. The fixing belt 20 is fit onto the perimeter of the heater holder 17.

The fixing belt 20 has a structure in which a silicone rubber layer (elastic layer) with a thickness of approximately 300 μm is formed on a cylindrical base material formed of cylindrical stainless-steel with a thickness of approximately 30 μm, and a surface layer is covered with a perfluoro alkoxy alkane (PFA) resin tube (foremost surface layer) with a thickness of approximately 30 μm.

The pressure roller 22 has a structure in which a silicone rubber layer with a thickness of approximately 2.5 mm is stacked on a surface of an iron (Fe) cored bar and a PFA resin tube with a thickness of approximately 50 μm is further stacked on the silicone rubber layer. End portions of the cored bar of the pressure roller 22 are rotatably held by respective plates on two sides of the fixing device 100.

A fixing unit including the fixing heater 16, the heater holder 17, and the fixing belt 20 is installed on the upper side of the pressure roller 22. This fixing unit is installed in parallel with the pressure roller 22 so that the fixing heater 16 of the fixing unit is in contact with the pressure roller 22.

The heater holder 17 is formed of liquid crystal polymer resin having high heat resistance, and plays a role of holding the fixing heater 16 and guiding a recording material along a circle trajectory of the fixing belt 20. Each end of the heater holder 17 is urged by a pressing mechanism, which is not illustrated, in an axis line direction of the pressure roller 22 by pressure of 157 N. Total pressure of 314 N is applied to the two ends of the heater holder 17. As a result, the surface of the fixing heater 16 is brought into pressure contact with the pressure roller 22 by predetermined pressing force resisting the elastic layer of the pressure roller 22 via the fixing belt 20, and forms a fixing nip portion 27 having a predetermined width necessary for fixing. In the present exemplary embodiment, the fixing belt 20 is a heating rotary member that applies heat to a recording material conveyed through the fixing nip portion 27.

The fixing heater 16 includes a resistance heating element B to which a conductive paste containing a silver and palladium alloy is evenly applied onto a ceramic substrate made of alumina or aluminum nitride in a film-like shape with a thickness of approximately 10 μm by a screen print method. Furthermore, glass coating has been performed on the resistance heating element B to ensure pressure resistance.

A thermistor 19 serves as a temperature detection unit. The thermistor 19 is disposed around a middle of the fixing belt 20 where recording materials of all sizes pass along a width direction of the fixing belt 20, detects a temperature of the fixing heater 16, and controls power to be supplied to the fixing heater 16 so that a temperature detected by a central thermistor becomes a target temperature.

(Cleaning Unit)

A fixing belt cleaning device 30 rubs a cleaning web 31 against the fixing belt 20, and thereby removes toner transferred to the fixing belt 20 (offset toner). The cleaning web 31 is pressed against a pressing roller 32, rubs against a circumferential surface of the fixing belt 20, and thereby collects offset toner from the fixing belt 20 onto cleaning web 31. The cleaning web 31 is pulled out from a supply roller and wound around a wind-up roller 33 bit by bit, and a new web surface comes in contact with a surface of the fixing belt 20. The cleaning web 31 is preferably thin and soft fiber paper that hardly scratches a surface of a fixing member in terms of a function of collecting offset toner. In the present exemplary embodiment, paper made of aramid fiber is used as the cleaning web 31. In the present exemplary embodiment, the configuration in which the cleaning web 31 is in contact with the fixing belt 20 is described, but some embodiments are not limited to the above-described configuration. A configuration may be adopted in which a metal rotary member that is in contact with the fixing belt 20 and that is rotated in step with the rotation of the fixing belt 20 is installed and the cleaning web 31 is in contact with the rotary member. The cleaning web 31 cleans off offset toner adhering to the rotary member to collect the offset toner. This makes it possible to prevent the fixing belt 20 from being scratched due to friction with the cleaning web 31. Controlling contact of the cleaning web 31 makes it possible to control a timing of executing a cleaning operation with the cleaning web 31, and the cleaning operation with the cleaning web 31 is performed at least during the supply of sheet to the fixing nip portion 27.

In a case of a job to perform borderless print on a large number of sheets, a massive number of sheets continuously pass through the fixing nip portion 27 and a conveyance path. Thus, offset toner in the neighborhood of edges exceeding an allowable retaining amount passes through the surface of the cleaning web 31. The allowable retaining amount is an amount of toner that can be retained on the surface of the cleaning web 31. As a result, offset toner that cannot be completely removed by the surface of the cleaning web 31 is re-transferred to and remains on the surface of the fixing belt 20.

Hence, in the present exemplary embodiment, an offset toner amount X at edges per unit width orthogonal to the sheet conveyance direction is calculated. The offset toner amount X is an offset toner amount that is preliminarily assumed according to a surface property of the sheet, a basis weight, size information, and image information. In a case of a job in which a total of a cumulative offset toner amount Xt and an offset toner amount at edges exceeds a threshold T, warning processing to prompt a sheet supply cleaning operation, which will be described later, is performed.

An amount of toner formed on a sheet is now described. As image data input to the image forming unit 5, data that has values of 0 to 255 in 600 dpi and that is separated into colors of cyan (C), magenta (M), yellow (Y), and black (K) included in an image of a document is input. Data per pixel is referred to as an image data amount. A maximum image data amount for each color is represented as 100%. An amount of toner that should be used to form an image is calculated according to the image data amount from 0 to 100%. The toner amount is an amount of toner per pixel to form an image on a recording material. The toner amount is represented as 0 to 100% similarly to the image data amount. A total weight of toner that forms an image in a range of an area of 1 $cm^2$ is referred to as a "toner application amount" [$mg/cm^2$]. In a case where the toner amount for a single color is 100%, the toner application amount for this color becomes a maximum toner application amount, and a density becomes a maximum density. In the present exemplary embodiment, the maximum toner application amount for each color is set at 0.4 $mg/cm^2$. In a case where a total of toner amounts for respective colors exceeds 250% at a maximum, a toner amount for each color is adjusted so that the total of toner amounts for respective colors is converted to 250% or less. Hence, the maximum toner application amount, which is a total of toner for respective colors, is 1.0 $mg/cm^2$.

In the present exemplary embodiment, a maximum toner application amount Cmax [mg/mm] per unit width is calculated based on image data amount distribution information, sheet information, and job information. The maximum toner application amount Cmax is a maximum toner application amount of toner formed at edges of a sheet. The edges of the sheet correspond to an image data region that is equivalent to ±5 mm from a sheet end position in a direction orthogonal the sheet conveyance direction. In the present exemplary embodiment, the image data region is set at ±5 mm in consideration of a high-accuracy registration position of the image forming apparatus to be used. Specifically, the sheet is divided into portions having widths in units of 1 mm in the direction orthogonal to the sheet conveyance direction, and a toner amount in a region having an area, which is obtained by multiplication of a corresponding divided width by 10, is calculated for respective two locations at two ends. Assume that a maximum value of the toner amount is Cmax. Assuming that a coefficient for calculating the offset toner amount in each sheet information is A, the offset toner amount is calculated by equation (1).

$$X = A \times \sum_{i=0}^{L} \text{Cmax}(L\text{: length in sheet conveyance } direciton[\text{mm}] \quad (1)$$

TABLE 1

Table for describing examples of toner amount coefficient according to first exemplary embodiment

| | Low surface property Uncoated paper | | High surface property Coated paper | |
|---|---|---|---|---|
| | Basis weight: up to 156 gsm | Basis weight: from 157 to 300 gsm | Basis weight: up to 156 gsm | Basis weight: from 157 to 300 gsm |
| Coefficient A for calculating offset toner | 1.0 | 1.2 | 1.3 | 1.5 |

Table 1 indicates the coefficient A for calculating the offset toner amount in each sheet information. As the surface has lower surface roughness, that is, higher glossiness, the coefficient A becomes higher. This is because an amount of toner to be used in forming an image increases as the sheet has lower surface roughness, that is, higher glossiness, which increases the offset toner amount. In a case where borderless print is performed, the offset toner amount in the neighborhood of edges of the recording paper also increases for similar reasons.

As the sheet has a larger basis weight, the coefficient A also becomes higher. This is because the larger basis weight of the sheet makes a heat capacity of the sheet itself higher and makes it hard to conduct heat, which increases the offset toner amount. In the case where borderless print is performed, an edge area of the sheet corresponding to the thickness of the sheet increases, whereby the offset toner amount in the neighborhood of edges increases.

In a borderless print job in an image forming flow according to the present exemplary embodiment, a setting of supplying 100 sheets of [OK top coat+127.9] (manufactured by Oji Paper Co., Ltd.) in A3 size is made. The image forming flow will be described below. Image information for forming an image in an image data amount of 250%, that is, a toner amount of 1.0 [mg/cm$^2$] in the whole region of the sheet is set. In the present setting, Cmax becomes maximum in a divided width region corresponding to edges on side surfaces.

Since a length of A3 size paper in a sheet supply conveyance direction is 420 mm and the coefficient A is 1.3 from Table 1, calculation is made based on the following equation (2) in the above-mentioned print job.

$$\sum_{i=0}^{L} \text{Cmax} = 1.0 \times 0.01 \times 420 \times 100 = 420[\text{mg/mm}], \quad (2)$$

$$X = A \times \sum_{i=0}^{L} \text{Cmax} = 546$$

At a time when the above-mentioned borderless print job is accepted, the cumulative offset toner amount Xt is 100. Based on the allowable retaining amount of toner that can be retained on the surface of the cleaning web 31 in the fixing device 100 in the present exemplary embodiment, the threshold T is set at 600. For the reasons described above, a relation of Xt+X=646>T holds, and thus it is possible to determine that the sheet supply cleaning operation is necessary. The sheet supply cleaning operation will be described below.

(Image Forming Flow)

Figure 4:
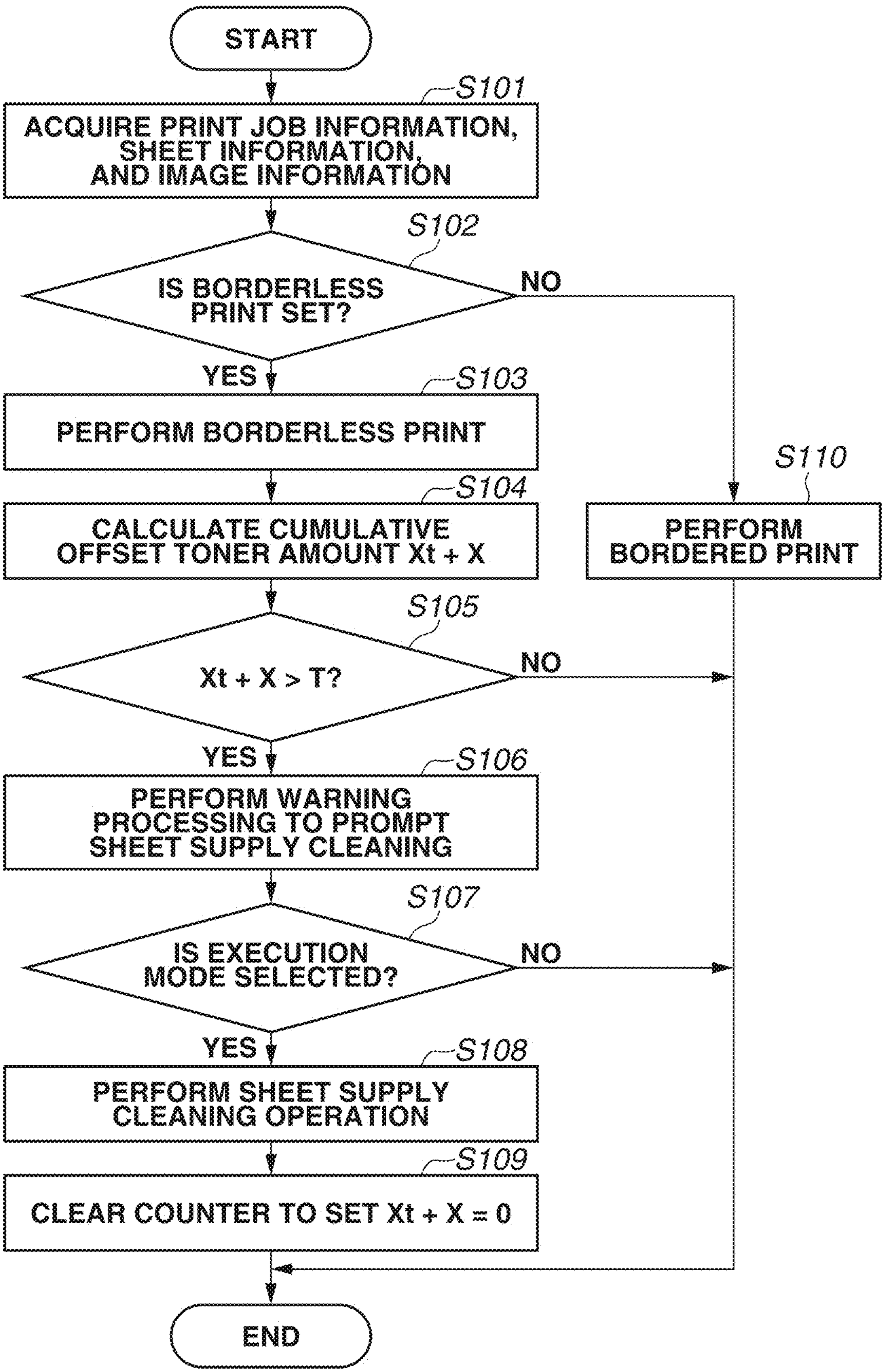
FIG. 4 is a flowchart describing an operation according to the first exemplary embodiment.

FIG. 4 illustrates a flowchart of a mode for issuing the warning to prompt the sheet supply cleaning operation in the present exemplary embodiment.

In step S101, the control unit 21 acquires printer job information, sheet information, and image information, each of which is input from the operation panel 112.

In step S102, the control unit 21 determines whether borderless print is designated based on the job information acquired in step S101. In a case where the borderless print is designated (YES in step S103), the processing proceeds to step S103. Otherwise (NO in step S103), the processing proceeds to step S110.

In step S103, the control unit 21 executes borderless print processing.

In step S104, the control unit 21 calculates the offset toner amount X at edges based on the sheet information and the image information. The control unit 21 calculates the cumulative offset toner amount Xt+the offset toner amount X at edges. The cumulative offset toner amount Xt is a cumulative amount of offset toner in jobs that have been previously executed before the present job since the latest reset. The present exemplary embodiment is described on the assumption of borderless print jobs that have been executed before the present job since the latest reset, but some embodiments are not limited to the example. The reason that a bordered print job is not factored in is that offset toner to be calculated from the bordered print job is assumed to be removed by cleaning with use of the cleaning web 31 every time.

In step S105, the control unit 21 determines whether a warning to prompt the sheet supply cleaning operation is necessary based on the cumulative offset toner amount Xt+X, which is determined from the surface property of the sheet, the basis weight, and the size information, and the preliminarily set threshold T. In a case where the control unit 21 determines that the warning is necessary (YES in step S105), the processing proceeds to step S106. In a case where the control unit 21 determines that the warning is not necessary (NO in step S105), the processing ends. In the present exemplary embodiment, the description has been given of the determination about whether to issue the warning to prompt the sheet supply cleaning operation from the relationship between the calculated toner amount and the preliminarily set threshold T, but some embodiments are not limited to the example. For example, a configuration of issuing the warning when the number of sheets in borderless print reaches a predetermined number may be adopted. Instead of calculation of the offset toner amount, the warning to prompt the sheet supply cleaning operation may be issued in a case where at least one of the surface property of the sheet, the basis weight, or the size information regarding the sheet satisfies a predetermined condition.

Figure 5A:
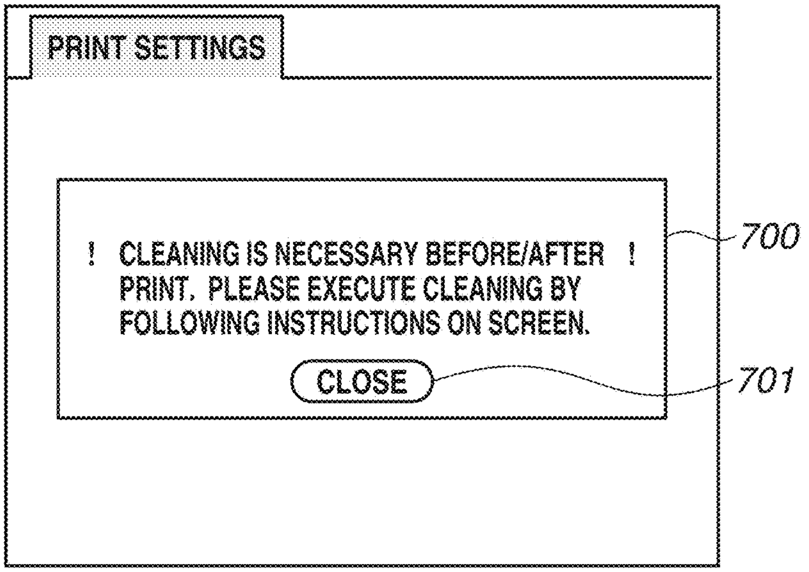
FIGS. 5A to 5C each illustrate an operation panel screen that describes an operation according to the first exemplary embodiment.
Figure 5B:
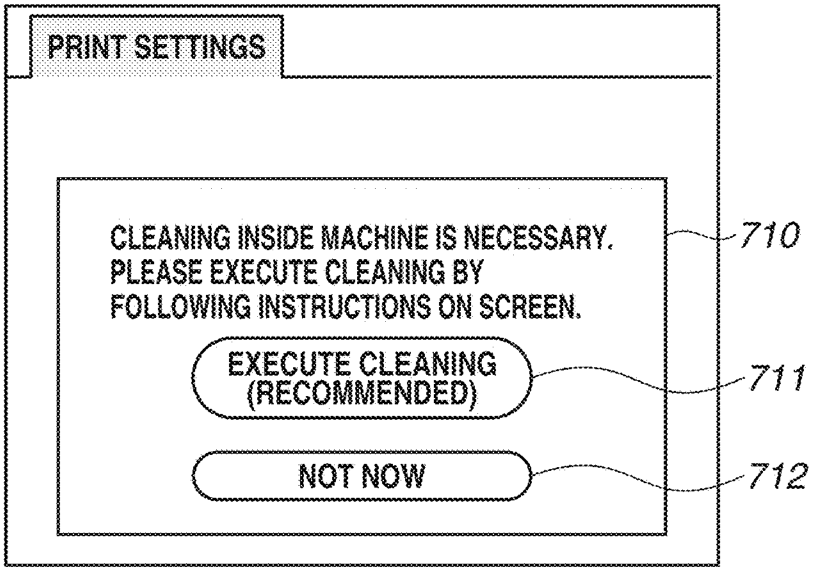
Figure 5C:
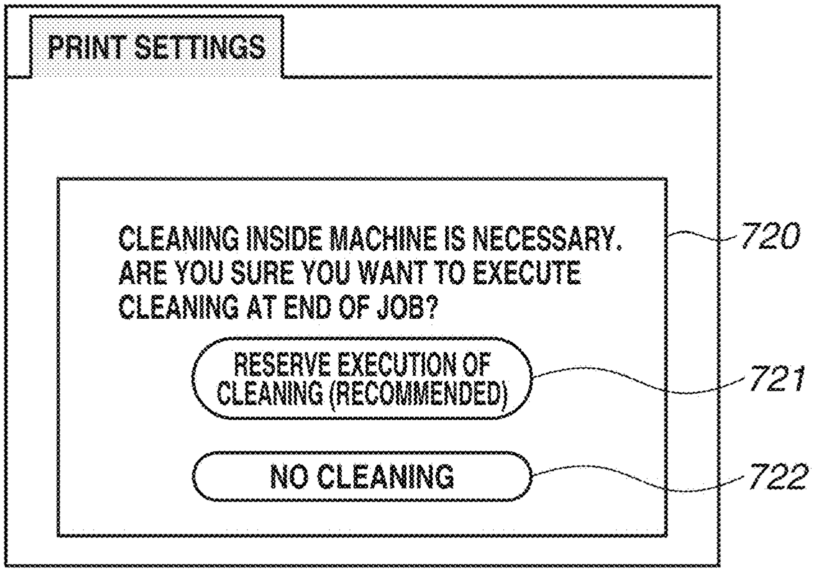

In step S106, the control unit 21 performs warning processing to prompt the sheet supply cleaning operation. Specifically, warning display to prompt sheet supply cleaning is performed or a screen for selecting execution of sheet supply cleaning is displayed on the operation panel 112 as illustrated in FIGS. 5A to 5C. The screen for selecting execution of sheet supply cleaning is also referred to as a cleaning execution screen. For example, the warning display to prompt sheet supply cleaning illustrated in FIG. 5A is performed during execution of print without the need to wait for the end of borderless print. The screen for selecting execution of the sheet supply cleaning illustrated in FIG. 5B may be displayed based on pressing of a close button 701 illustrated in FIG. 5A or the end of borderless print.

In step S107, the control unit 21 determines whether to execute the sheet supply cleaning operation based on user selection information input from the operation panel 112. In a case where the sheet supply cleaning operation is to be executed (YES in step S107), the processing proceeds to step S108. Otherwise (NO in step S107), the processing ends.

In step S108, the control unit 21 executes the sheet supply cleaning operation. Assume that the sheet supply cleaning operation is executed after the end of the job executed in step S103.

In step S109, the control unit 21 clears a cumulative toner offset amount counter.

In step S110, the control unit 21 executes bordered print processing.

FIGS. 5A to 5B are views for describing examples of the warning processing according to the present exemplary embodiment. In step S105, as illustrated in FIG. 5A, the control unit 21 displays a warning screen 700 on the operation panel 112 or an apparatus 300. A message described on the warning screen 700 is merely an example, and a message is not limited to the example. When the close button 701 is selected, the warning screen 700 is closed. In step S108, as illustrated in FIG. 5B, the control unit 21 displays a warning screen 710 on the operation panel 112 or the apparatus 300. When an operation key 711 is selected, the control unit 21 displays a sheet supply cleaning operation processing screen, which will be described below. When an operation key 712 is selected, the control unit 21 closes the warning screen 710 without executing the sheet supply cleaning operation.

Figure 6:
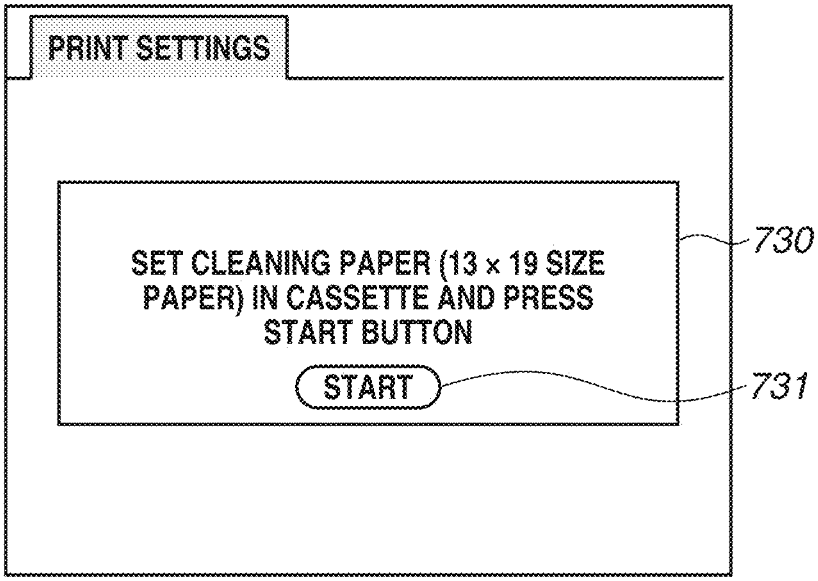
FIG. 6 illustrates an operation panel screen that describes an operation according to the first exemplary embodiment.

FIG. 6 is a diagram for describing the sheet supply cleaning operation according to the present exemplary embodiment. In step S110, as illustrated in FIG. 6, the control unit 21 displays a sheet supply cleaning operation processing screen 730 on the operation panel 112 or the apparatus 300. When an operation key 731 is selected, the control unit 21 executes the sheet supply cleaning operation.

(Sheet Supply Cleaning Operation)

When an instruction for executing the sheet supply cleaning operation is input to the control unit 21, a first sheet of cleaning paper is supplied from the sheet feeding mechanism 7. For example, one sheet with a width of 13 inches is used as cleaning paper. The cleaning paper is only required to remove offset toner inside the image forming apparatus, and a type of cleaning paper and the number of sheets are not limited to the example. In a case where there is a plurality of sheet feeding units, like sheet feeding units 7*a* and 7*b* in an apparatus 1, a sheet feeding unit may be able to be selected by the user at the time of executing the sheet supply cleaning operation, or may be automatically selected based on a priority order.

The fed cleaning paper passes through the sheet conveyance path 10, and is introduced into the fixing device 100 in a state where a toner image is not formed on a front surface and a back surface of the cleaning paper. The cleaning paper with a maximum width passes through the fixing nip portion 27, whereby offset toner remaining on the surface of the fixing belt is transferred to the cleaning paper and can be removed.

In the present exemplary embodiment, the cleaning paper is used in the state where a toner image is not formed thereon, but the toner image may be formed in a case where cleanability improves. The configuration of removing offset toner by sheet supply cleaning is adopted, but a toner cleaning means may be implemented other than the sheet supply cleaning operation. The fixing device 100 in the present exemplary embodiment includes the cleaning unit, but may not include the cleaning unit. Assume that cleaning with the cleaning web 31 is executed even at the time of sheet supply cleaning.

As described above, in a case of the job that causes a large amount of adhering toner in borderless print, a screen that issues the warning or that prompts execution of the sheet supply cleaning operation is displayed after execution of the job. With this configuration, it is possible to notify the user of soils before soils on an image on a subsequent sheet become visible, and appropriately remove toner adhering to and accumulated in the main body of the image forming apparatus.

In the first exemplary embodiment, the cleaning operation is performed after execution of borderless print. However, in a case where there are a larger number of sheets in borderless print, there is a possibility that soils are caused on an image on a sheet during borderless print. To address this issue, a second exemplary embodiment is directed to execution of a cleaning operation before execution of borderless print, and prevention of soils on an image on a sheet. Since a configuration, warning processing, and a cleaning operation are similar to those in the first exemplary embodiment, a description thereof is omitted.

In a borderless print job in an image forming flow according to the present exemplary embodiment, a setting of supplying 1000 sheets of [OK top coat+128 gsm] (manufactured by Oji Paper Co., Ltd.) in A3 size is made. The image forming flow will be described below. Image information for forming an image in an image data amount of 250%, that is, a toner amount of 1.0 [mg/cm$^2$] in the whole region of the sheet is set. In the present setting, Cmax becomes maximum in a divided width region corresponding to edges on side surfaces.

Since a length of A3 size paper in a sheet supply conveyance direction is 420 mm and the coefficient A is 1.3 from Table 1, calculation is made based on the following equation (3) in the following print job.

$$\sum_{i=0}^{L} \mathrm{Cmax} = 1.0 \times 0.01 \times 420 \times 1000 = 4200[\mathrm{mg/mm}], \quad X = A \times \sum_{i=0}^{L} \mathrm{Cmax} = 819 \tag{3}$$

At a time when the above-mentioned borderless print job is accepted, the cumulative offset toner amount Xt is 500. Based on the allowable retaining amount of toner that can be retained on the surface of the cleaning web 31 in the fixing device 100 in the present exemplary embodiment, the threshold T is set at 600. For the reasons described above, a relation of Xt+X=1319>T holds, and thus it is possible to determine that the sheet supply cleaning operation is necessary. However, the cumulative offset toner amount Xt at the time of 19 sheets in borderless print is 603, which has already exceeded the preliminarily set threshold T. Hence, there is a possibility that offset toner that cannot be completely removed from the 20-th sheet is re-transferred to the surface of the fixing belt 20 and further transferred onto the sheet, which causes soils.

In the present exemplary embodiment, the cleaning operation is performed not only after execution of borderless print, but also before execution of print.

Figure 7:
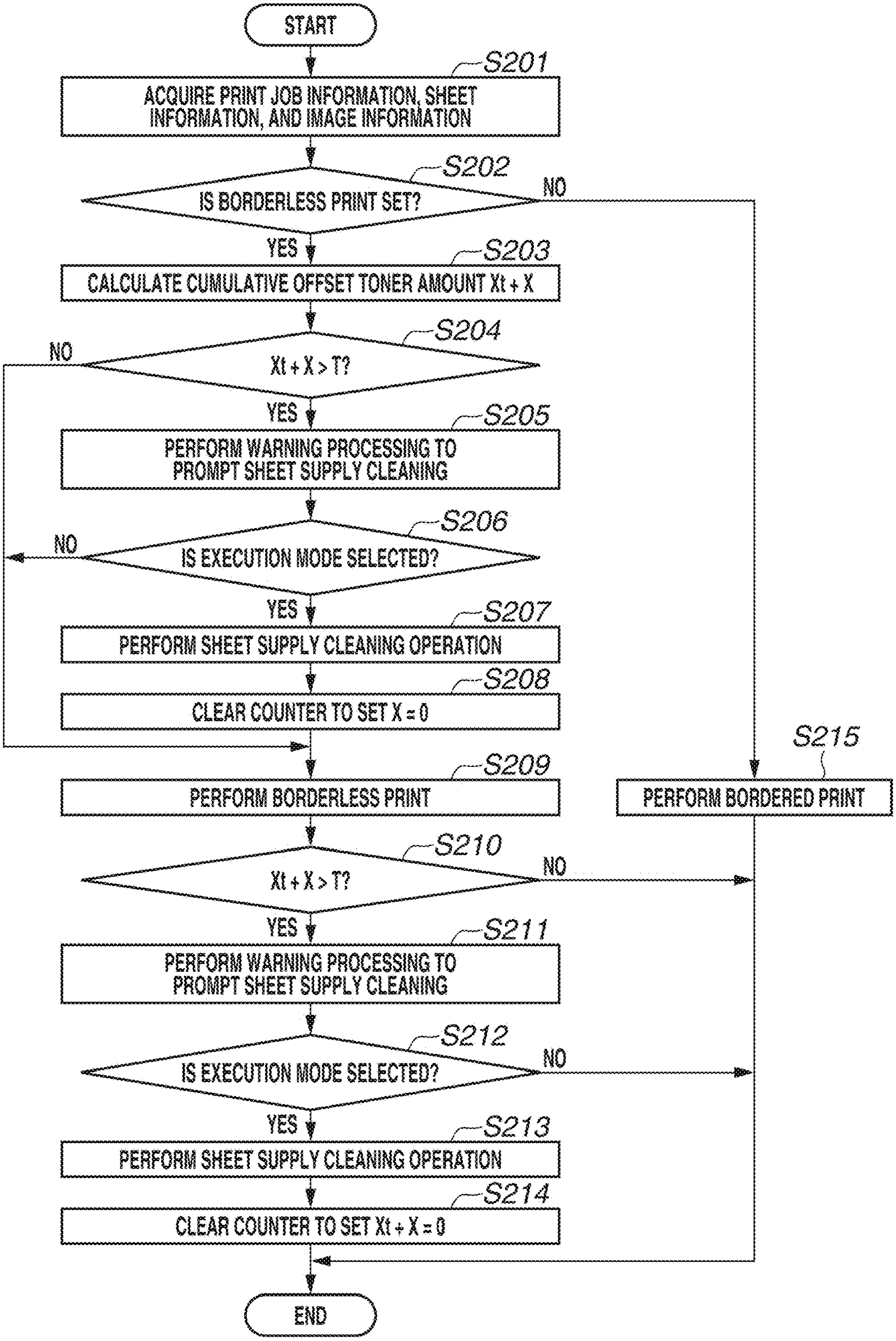
FIG. 7 is a flowchart describing an operation according to a second exemplary embodiment.

FIG. 7 illustrates a flowchart of a mode for issuing the warning to prompt the sheet supply cleaning operation in the present exemplary embodiment.

In step S201, the control unit 21 acquires printer job information, sheet information, and image information, each of which is input from the operation panel 112.

In step S202, the control unit 21 determines whether borderless print is designated based on the job information acquired in step S201. In a case where the borderless print is designated (YES in step S202), the processing proceeds to step S203. Otherwise (NO in step S202), the processing proceeds to step S215.

In step S203, the control unit 21 calculates the cumulative offset toner amount Xt+X based on the sheet information and the image information.

In step S204, the control unit 21 determines whether a warning to prompt the sheet supply cleaning operation is necessary based on the cumulative offset toner amount Xt+X, which is determined from the surface property of the sheet, the basis weight, and the size information, and a preliminarily set threshold T2. In a case where the control unit 21 determines that the warning is necessary (YES in step S204), the processing proceeds to step S205. In a case where the control unit 21 determines that the warning is not necessary (NO in step S204), the processing proceeds to step S209.

In step S205, the control unit 21 performs warning processing to prompt the sheet supply cleaning operation.

In step S206, the control unit 21 determines whether to execute the sheet supply cleaning operation based on user selection information input from the operation panel 112. In a case where the sheet supply cleaning operation is to be executed (YES in step S206), the processing proceeds to step S207. Otherwise (NO in step S206), the processing proceeds to step S209.

In step S207, the control unit 21 executes the sheet supply cleaning operation.

In step S208, the control unit 21 clears a cumulative toner offset amount counter.

In step S209, the control unit 21 executes borderless print processing.

In step S210, the control unit 21 determines whether the warning to prompt the sheet supply cleaning operation is necessary based on the cumulative offset toner amount Xt+X, which is determined from the surface property of the sheet, the basis weight, and the size information, and the preliminarily set threshold T. In a case where the control unit 21 determines that the warning is necessary (YES in step S210), the processing proceeds to step S211. In a case where the control unit 21 determines that the warning is not necessary (NO in step S210), the processing ends.

In step S211, the control unit 21 performs selection screen processing to select whether to execute the sheet supply cleaning operation.

In step S212, the control unit 21 determines whether to execute the sheet supply cleaning operation based on user selection information input from the operation panel 112. In a case where the sheet supply cleaning operation is to be executed (YES in step S212), the processing proceeds to step S213. Otherwise (NO in step S212), the processing ends.

In step S213, the control unit 21 executes the sheet supply cleaning operation.

In step S214, the control unit 21 clears the cumulative toner offset amount counter.

In step S215, the control unit 21 executes bordered print processing.

In step S205 or step S212, as illustrated in FIG. 5B, the control unit 21 displays the warning screen 710 on the operation panel 112 or the apparatus 300. When the operation key 711 is selected, the control unit 21 displays the sheet supply cleaning operation processing screen. When the operation key 712 is selected, the control unit 21 closes the warning screen 710 without executing the sheet supply cleaning operation.

As described above, even in a case of the job that causes a large amount of adhering toner in borderless print, it is possible to notify the user of soils before soils on an image on subsequent paper become visible, and appropriately remove toner adhering to and accumulated in the main body of the image forming apparatus.

In the present exemplary embodiment, the configuration in which the warning is displayed before execution of print is adopted, but a configuration may be adopted in which the offset toner amount X at edges is incremented every sheet and the warning is displayed when the offset toner amount X at edge exceeds the threshold T during continuous print. In the present exemplary embodiment, the threshold T that is used for determination about whether to display the warning before and after print is an identical value, but may be changed before and after print.

A third exemplary embodiment is directed to prevention of soils on an image on a print sheet in a subsequent job after execution of borderless print. Adhering and accumulated offset toner in borderless print increases in amount at side edges of a sheet on which borderless print has been performed mainly in a positional direction orthogonal to the sheet conveyance direction. Hence, in a case where a width of a sheet at the time of performing print in a subsequent job is larger than a width of a sheet at the time of performing borderless print in a preceding job, there is a possibility that offset toner in the preceding job is transferred onto the sheet in the subsequent job, which causes soils.

In the present exemplary embodiment, in a case where the width of the print sheet in the subsequent job after borderless print is larger than the width of the sheet at time of performing borderless print in the preceding job and the cumulative offset toner amount Xt exceeds the threshold T, the control unit 21 prompts the user to perform the sheet supply cleaning operation. Since how to prompt the user to perform the sheet supply cleaning operation including a configuration, warning processing, and a cleaning operation is similar to that in the first exemplary embodiment, a description thereof is omitted.

In a print job in an image forming flow according to the present exemplary embodiment, bordered print is set, and a setting of supplying 100 sheets of [OK top coat+128 gsm] (manufactured by Oji Paper Co., Ltd.) in A3 size, that is, sheets with a width of 210 mm, is made. The image forming flow will be described below.

At a time when the above-mentioned print job is accepted, the cumulative offset toner amount Xt is 500, and a width Wd=148 mm is set as sheet information regarding borderless print in the preceding job. Based on the allowable retaining amount of toner that can be retained on the surface of the cleaning web 31 in the fixing device 100 in the present exemplary embodiment, the threshold T is set at 400. For the reasons described above, a relation of Xt>T and a relation of W>Wd hold, and thus it is possible to determine that the sheet supply cleaning operation is necessary.

(Image Forming Flow)

Figure 8:
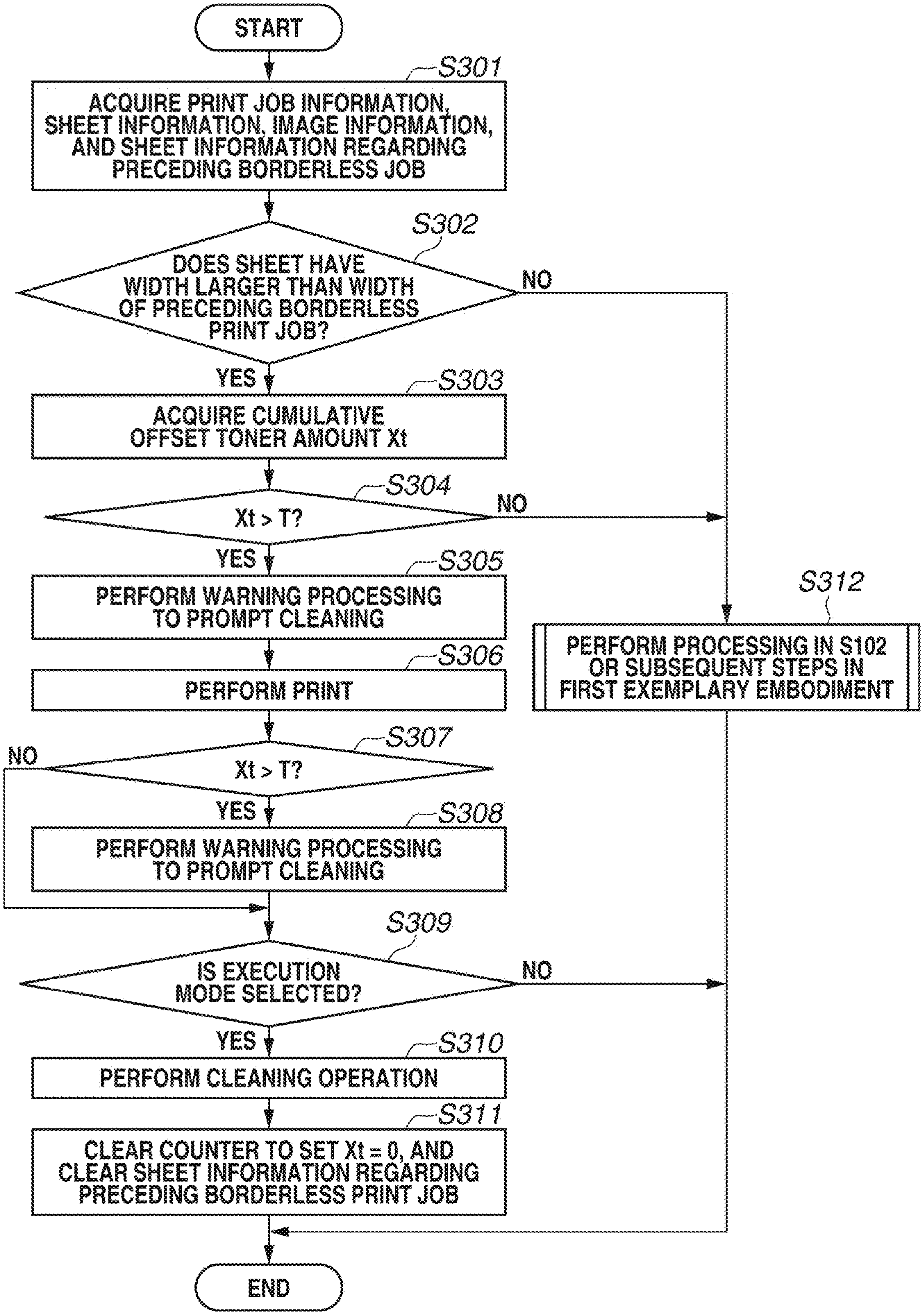
FIG. 8 is a flowchart describing an operation according to a third exemplary embodiment.

FIG. 8 illustrates a flowchart of a mode for issuing the warning to prompt the sheet supply cleaning operation in the present exemplary embodiment.

In step S301, the control unit 21 acquires printer job information, sheet information, image information, and sheet information regarding a preceding borderless print job, each of which is input from the operation panel 112. The sheet information regarding the preceding borderless print job is width information regarding sheets that have been used in borderless print.

In step S302, the control unit 21 determines whether a sheet having a width that is larger than a width of a sheet in a preceding borderless print job is set based on the job information and the sheet information regarding the preceding borderless print job, each of which is acquired in step S301. In a case where the sheet is set (YES in step S302), the processing proceeds to step S303. Otherwise (NO in step S302), the processing proceeds to step S312.

In step S303, the control unit 21 acquires the cumulative offset toner amount Xt.

In step S304, the control unit 21 determines whether the warning to prompt the sheet supply cleaning operation is necessary based on the cumulative offset toner amount Xt. In a case where the control unit 21 determines that the warning is necessary (YES in step S304), the processing proceeds to step S305. In a case where the control unit 21 determines that the warning is not necessary (NO in step S204), the processing proceeds to step S306.

In step S305, the control unit 21 performs warning processing to prompt the sheet supply cleaning operation.

In step S306, the control unit 21 executes print processing for the print job.

In step S307, the control unit 21 determines whether the warning to prompt the sheet supply cleaning operation is necessary similarly to step S204.

In step S308, the control unit 21 performs selection screen processing to select whether to execute the sheet supply cleaning operation.

In step S309, the control unit 21 determines whether to execute the sheet supply cleaning operation based on user selection information input from the operation panel 112. In a case where the sheet supply cleaning operation is to be executed (YES in step S309), the processing proceeds to step S310. Otherwise (NO in step S309), the processing ends.

In step S310, the control unit 21 executes the sheet supply cleaning operation.

In step S311, the control unit 21 clears the cumulative toner offset amount counter and sheet information regarding the preceding borderless print job.

In step S312, the control unit 21 executes processing in step S102 or subsequent steps in the flow according to the first exemplary embodiment.

In the present exemplary embodiment, the configuration of acquiring the sheet information regarding the preceding job and the cumulative toner offset amount information is adopted, but a configuration of dividing the sheet in a width direction in alignment with width sections and setting a plurality of cumulative toner offset amount counters in the respective divided regions at the time of borderless print may be adopted.

As described above, in a case where the width of the print sheet in the subsequent borderless print job is larger than the width of the print sheet in the preceding job, it is possible to notify the user of soils before soils on an image on a subsequent sheet become visible, and appropriately remove toner.

In the first exemplary embodiment, the control unit 21 performs the warning processing to prompt cleaning during execution of the job or after execution of the job, but may be configured to perform warning processing to prompt cleaning before execution of the job and schedule execution of cleaning after execution of the job. In a fourth exemplary embodiment, an operation of scheduling a cleaning operation at the end of the job will be described. Since a configuration, warning processing, and a cleaning operation are similar to those in the first exemplary embodiment, a description thereof is omitted.

Figure 10:
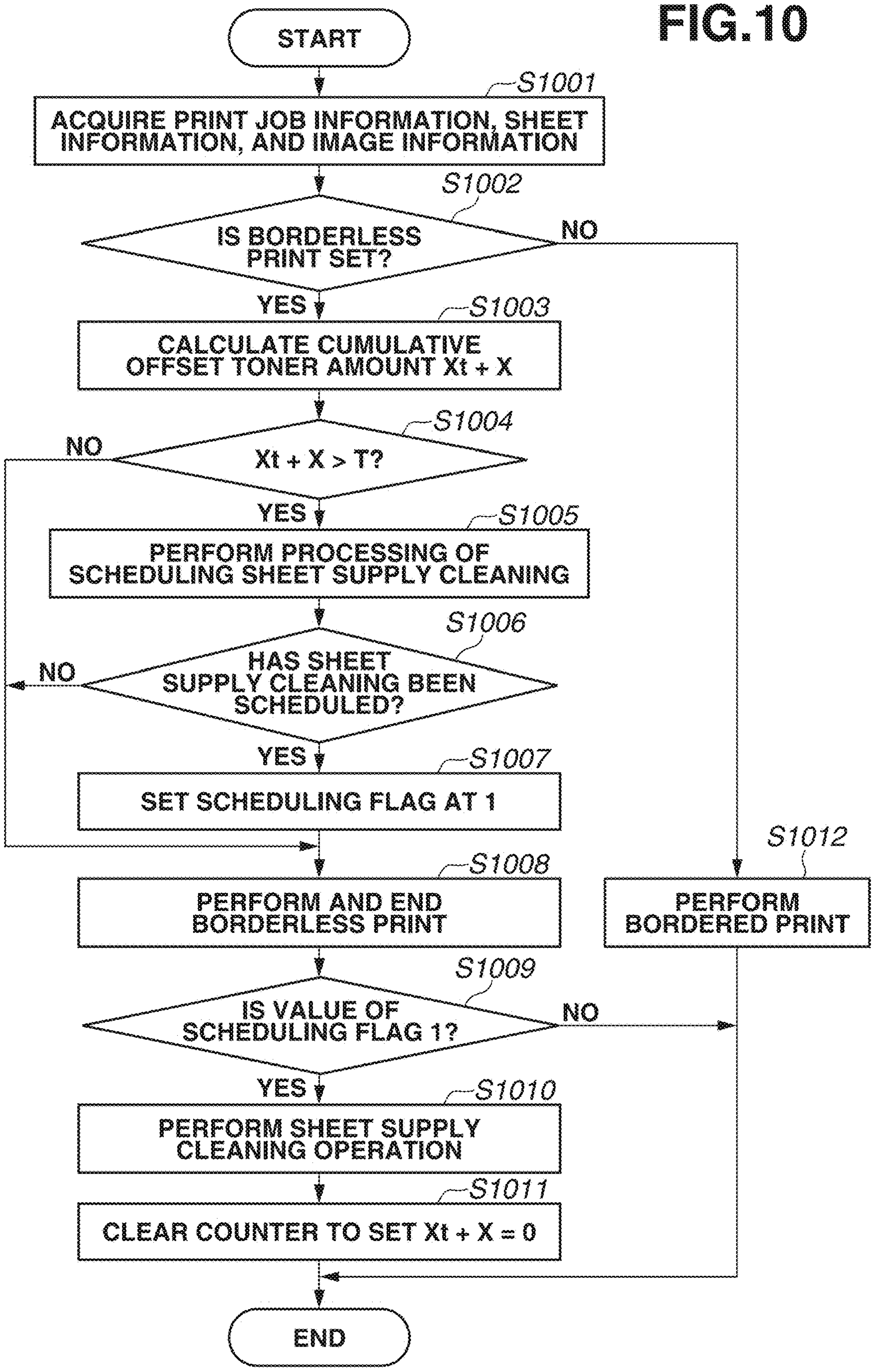
FIG. 10 is a flowchart describing an operation according to a fourth exemplary embodiment.

FIG. 10 illustrates a flowchart of a mode of scheduling the sheet supply cleaning operation in the present exemplary embodiment.

In step S1001, the control unit 21 acquires printer job information, sheet information, and image information, each of which is input from the operation panel 112.

In step S1002, the control unit 21 determines whether borderless print is designated based on the job information acquired in step S1001. In a case where the borderless print is designated (YES in step S1002), the processing proceeds to step S1003. Otherwise (NO in step S1002), the processing proceeds to step S1012.

In step S1003, the control unit 21 calculates the cumulative offset toner amount Xt+the offset toner amount X at edges based on the sheet information and the image information. The cumulative offset toner amount Xt is a cumulative amount of offset toner in jobs that have been previously executed before the present job since the latest reset.

In step S1004, the control unit 21 determines whether scheduling processing of scheduling the sheet supply cleaning operation is necessary based on the cumulative offset toner amount Xt+X, which is determined from the surface property of the sheet, the basis weight, and the size information, and the preliminarily set threshold T. In a case where the control unit 21 determines that the scheduling processing is necessary (YES in step S1004), the processing proceeds to step S1005. In a case where the control unit 21 determines that the scheduling processing is not necessary (NO in step S1004), the processing ends.

In step S1005, the control unit 21 performs the scheduling processing of scheduling the sheet supply cleaning operation. Specifically, a sheet supply cleaning scheduling display screen illustrated in FIG. 5C is displayed on the operation panel 112. When an operation key 721 is selected on the sheet supply cleaning scheduling screen, the control unit 21 schedules the sheet supply cleaning operation, which will be described below. When the operation key 722 is selected, the control unit 21 closes a screen 720 without scheduling the sheet supply cleaning operation.

In step S1006, the control unit 21 determines whether the scheduling for the sheet supply cleaning operation has been made. Specifically, in a case where the operation key 721 is selected (step S1006), the processing proceeds to step S1007. In a case where an operation key 722 is selected (NO in step S1006), the processing proceeds to step S1008.

In step S1007, the control unit 21 rewrites a scheduling flag stored in a storage unit from 0 to 1. The storage unit is not illustrated. In the present exemplary embodiment, a description is given of scheduling control using the flag stored in the storage unit, but how to hold a value and a scheduling method are not specifically limited to the example.

In step S1008, the control unit 21 executes borderless print processing. When the borderless print processing ends, the processing proceeds to step S1009.

In step S1009, the control unit 21 refers to a value of the scheduling flag. In a case where the scheduling has been made (YES in step S1009), the processing proceeds to step S1010. In a case where the scheduling has not been made (NO in step S1009), the processing ends.

In step S1010, the control unit 21 executes the sheet supply cleaning operation.

In step S1011, the control unit 21 clears the cumulative toner offset amount counter.

In step S1012, the control unit 21 executes bordered print processing.

For the reasons described above, it is possible to issue the warning to prompt the sheet supply cleaning operation and schedule the sheet supply cleaning operation before execution of a job having a high possibility that the user sees the operation panel, whereby it is possible to prevent toner adhering to and accumulated in the main body of the image forming apparatus from being left and appropriately remove toner.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2024-065810, which was filed on Apr. 15, 2024 and which is hereby incorporated by reference herein in its entirety.

What is claimed is:

1. An image forming apparatus capable of executing a borderless print job to form a toner image at edges of a recording material to which a borderless print mode is set and of executing a bordered print job not to form a toner image at the edges of the recording material, the image forming apparatus comprising:

at least one processor configured to:

control a display unit to display a screen, wherein, after the borderless print mode is set and before printing of the borderless print job is started, the display unit is controlled to display a warning screen that prompts execution of a cleaning operation based on job information regarding the borderless print job; and after execution of the borderless print job is completed, perform control to execute a cleaning operation to clean an inside of the image forming apparatus with conveyed paper.

2. The image forming apparatus according to claim 1, wherein the at least one processor is further configured to control the display unit to display a cleaning execution screen that is different from the warning screen, and wherein, after a predetermined operation is accepted on the cleaning execution screen, the at least one processor is further configured to perform control to execute the cleaning operation.

3. The image forming apparatus according to claim 2, wherein the at least one processor is further configured to control the display unit to display the cleaning execution screen before execution of the borderless print job, and wherein, after a predetermined operation is accepted on the cleaning execution screen, the at least one processor is further configured to perform control to execute the cleaning operation.

4. The image forming apparatus according to claim 1, further comprising:

a pressure rotary member configured to be rotatable;

a heating rotary member configured to be rotatable and form a nip portion by coming in contact with the pressure rotary member; and a fixing device configured to apply heat and pressure to a recording material that bears a toner image in the nip portion and thereby fix the toner image to the recording material, wherein the at least one processor is further configured to perform control to clean toner adhering to the heating rotary member with paper conveyed by the nip portion of the fixing device.

5. The image forming apparatus according to claim 4, further comprising a cleaning web configured to clean toner adhering to the heating rotary member at time of execution of image formation in the image forming apparatus, wherein, when the at least one processor performs control to execute the cleaning operation, cleaning is executed with the cleaning web.

6. The image forming apparatus according to claim 1, wherein the at least one processor is further configured to, in response to acceptance of the borderless print job, calculate an offset toner amount based on the job information regarding the borderless print job, and in a case where a cumulative offset toner amount including the calculated offset toner amount based on the job information regarding the borderless print job satisfies a predetermined value, control the display unit to display the warning screen.

7. The image forming apparatus according to claim 6, wherein, when the at least one processor performs control to execute the cleaning operation, a value of the cumulative offset toner amount is reset.

8. The image forming apparatus according to claim 1, wherein the job information includes a surface property and size information about the recording material.

9. The image forming apparatus according to claim 8, wherein, in a case where preceding job information indicates first size information and subsequent job information indicates second size information that is smaller than the first size information, the at least one processor controls the display unit to not display the warning screen.

10. The image forming apparatus according to claim 1, wherein the job information includes image data.

* * * * *